(12) United States Patent
Ramos et al.

(10) Patent No.: US 11,364,680 B1
(45) Date of Patent: Jun. 21, 2022

(54) HYBRID ADDITIVE MANUFACTURING WITH DUAL PHASE CHANGE MATERIALS

(71) Applicant: Inkbit, LLC, Medford, MA (US)

(72) Inventors: Javier Ramos, Boston, MA (US); Richard Woudenberg, Burlington, MA (US); Wojciech Matusik, Lexington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 17/330,911

(22) Filed: May 26, 2021

(51) Int. Cl.
| | | |
|---|---|---|
| *B29C 33/38* | (2006.01) | |
| *B33Y 80/00* | (2015.01) | |
| *B33Y 70/00* | (2020.01) | |
| *B33Y 10/00* | (2015.01) | |
| *B29K 91/00* | (2006.01) | |
| *B29C 64/165* | (2017.01) | |

(52) U.S. Cl.
CPC ........ *B29C 64/165* (2017.08); *B29C 33/3842* (2013.01); *B33Y 10/00* (2014.12); *B33Y 70/00* (2014.12); *B33Y 80/00* (2014.12); *B29K 2091/00* (2013.01)

(58) Field of Classification Search
None
See application file for complete search history.

(56) References Cited

U.S. PATENT DOCUMENTS

| | | | |
|---|---|---|---|
| 5,506,607 A | 4/1996 | Sanders, Jr. et al. | |
| 5,740,051 A | 4/1998 | Sanders, Jr. et al. | |
| 10,751,951 B1 * | 8/2020 | Nguyen | B29C 64/182 |
| 10,953,462 B1 * | 3/2021 | Zenere | B22C 7/02 |
| 2007/0029693 A1 | 2/2007 | Wigand et al. | |
| 2010/0021638 A1 | 1/2010 | Varanka et al. | |
| 2013/0119577 A1 | 5/2013 | You et al. | |
| 2013/0228953 A1 * | 9/2013 | Ikeda | B29C 64/112 |
| | | | 264/401 |
| 2015/0258744 A1 * | 9/2015 | Muller | B29C 64/165 |
| | | | 264/37.29 |
| 2016/0333165 A1 * | 11/2016 | Bayer | B33Y 40/00 |
| 2017/0158816 A1 * | 6/2017 | Martinoni | C08J 3/12 |
| 2018/0257138 A1 * | 9/2018 | Mark | B22F 1/0085 |
| 2018/0264731 A1 * | 9/2018 | Kritchman | B29C 64/106 |
| 2019/0345276 A1 | 11/2019 | Liska et al. | |
| 2019/0366641 A1 * | 12/2019 | Innes | B33Y 40/00 |
| 2019/0389123 A1 * | 12/2019 | Parker | B29C 64/112 |
| 2020/0040113 A1 | 2/2020 | Liska et al. | |
| 2020/0232109 A1 * | 7/2020 | Hoffman | B29C 64/20 |
| 2020/0316856 A1 * | 10/2020 | Mojdeh | A61C 7/08 |
| 2021/0002396 A1 | 1/2021 | Liska et al. | |

* cited by examiner

*Primary Examiner* — Leith S Shafi
*Assistant Examiner* — Inja Song
(74) *Attorney, Agent, or Firm* — Occhiuti & Rohlicek LLP

(57) ABSTRACT

A manufacturing method includes using an additive manufacturing process to form a first object. The first object includes layers, among which is a first layer that comprises a first material and a second material. The first material surrounds the second material within the first layer. Both materials are solids that transition into liquids at corresponding first and second temperatures, the first temperature being lower than the second temperature. The method includes, after having formed the first object, exposing the first object to a temperature that is between the first temperature and the second temperature such that the first material melts, thereby leaving behind a second object, the second object comprising the second material.

13 Claims, 7 Drawing Sheets

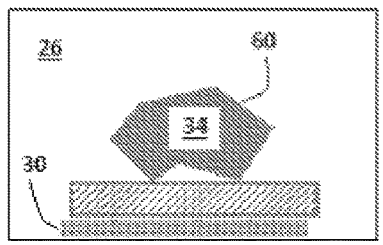

FIG. 10

| Support Wax | Melting Point (°C) | Build Wax | Melting Point (°C) |
|---|---|---|---|
| Lauryl Alcohol | 26 | Unilin 325 | 78 |
| Myristyl Alcohol | 39 | N-methyl-p-toluenesulfonamide | 79 |
| Cetyl Alcohol | 50 | Polywax 400 | 81 |
| Kzester Wax K-38S | 50 | Stearyl Erucamide | 81 |
| Kester Wax K-56 | 56 | Indrawax 185-M | 85 |
| Stearyl Alcohol | 58 | Kester Wax K-82H | 85 |
| Kester Wax K-59 | 59 | Polywax 500 | 88 |
| Kester Wax K-62 | 65 | Sasol Wax C80 | 88 |
| Behenyl Alcohol | 68 | Performalene M90 | 90 |
| Ethylene Glycol Distearate | 70 | Unilin 425 | 91 |
| Kester Wax K-72 | 72 | Unicid 350 | 92 |
| | | Polywax 600 | 94 |
| | | Stearyl Stearamide | 94 |
| | | Petrolite EP-700 | 96 |
| | | Polywax 655 | 99 |
| | | Unilin 550 | 99 |
| | | Unicid 550 | 101 |
| | | Stearamide | 101 |
| | | Polywax 725 | 104 |
| | | Unilin 700 | 105 |
| | | Polywax 850 | 107 |
| | | Behenamide | 108 |
| | | Unicid 700 | 110 |
| | | m-Toluene Sulfonamide | 110 |
| | | Unilin 1000 | 112 |
| | | Polywax 1000 | 113 |
| | | p-Toluene Sulfonamide | 135 |
| | | Kemamide EBS | 143 |

FIG. 11

HYBRID ADDITIVE MANUFACTURING WITH DUAL PHASE CHANGE MATERIALS

BACKGROUND

A solid object can be manufactured in a variety of ways. One way is to begin with a substrate and to remove material therefrom so as to sculpt the desired object. This is referred to as "subtractive manufacture." Examples of machines that carry out subtractive manufacture include a lathe or router.

Another way is to build the object by adding small amounts of material at various locations. This process of accretion is generally referred to as "additive manufacture."

Some additive-manufacturing machines function much like inkjet printers. Such machines feature jets that eject various materials towards a platform to form a layer. After this layer has hardened sufficiently, the jets eject another layer.

SUMMARY

The invention features a manufacturing process having an additive step and a subtractive step. The additive step is that of constructing a composite object from two materials. This is carried out by an additive-manufacturing machine. The subtractive step is that of melting away one of the two materials to leave behind a kernel that comprises the remaining material. The hybrid additive-subtractive manufacturing process provides a simple way to construct complex structures with overhangs that might otherwise deform. The resulting kernel can be used on its own or be used as a mold or cast for manufacturing another object.

In one aspect, the invention features a manufacturing method includes using an additive manufacturing process to form a first object. The first object includes layers, among which is a first layer that comprises a first material and a second material. The first material is adjacent to or surrounds the second material within the first layer. Both materials are solids that transition into liquids at corresponding first and second temperatures, the first temperature being lower than the second temperature. The method includes, after having formed the first object, exposing the first object to a temperature that is between the first temperature and the second temperature such that the first material melts, thereby leaving behind a second object, the second object comprising the second material.

Among the practices of the method are those that include using the second object as a mold for molding or casting a product. Examples of suitable products include those that mimic anatomical parts, such as crowns, orthodontic appliances, body prostheses, and the like.

Also, among the practices of the method are those that include fabricating a product from a third material. In some of these practices, the third material has a melting point that is higher than that of the second material. In such practices, fabricating the product comprises depositing the third material onto the second object and exposing the second and third materials to a temperature higher than the second temperature and lower than the melting point of the third material. In others of these practices, the third material has a melting point that is lower than that of the second material. These practices include mechanically separating the second and third materials. An example of such a practice is that of thermoforming the third material using the second material to make a suitable impression.

Still other practices rely on electrical deposition methods. Among these are embodiments that include depositing a conductor onto the second object, applying a voltage to the conductor while the second object is immersed in a solution, and causing solute from the solution to precipitate onto the conductor.

Among the practices are those in which the first object comprises a first volume and a second volume, the first volume being made of the first material and the second volume being made of the second material with the first volume being at least partially within the second volume. In such practices, a drainage channel leads from a surface of the first object to the first volume to permit drainage of the first material from the first volume during exposure of the first object to the temperature.

Other practices include recovering at least some of the first material and, optionally, using the recovered first material to make another first object.

In some practices that include using the second object to make a product, the method includes melting the second material and recovering at least a portion of it. Among these are practices that include and using the recovered second material to make another first object.

Further practices include those in which second object comprises reinforcements in the second material. There reinforcements can be added in several ways. These include prefabricated reinforcements that have been embedded in the second object, for example by having been inserted during the printing process. As an example, it is possible to embed one or more wires during the printing process. In the alternative, it is also possible, while printing the second material, to also print small regions from a reinforcement material. An example of a suitable material reinforcement material is a photocurable resin of the type curable with ultraviolet radiation. This results in a three-dimensional lattice made of the photocurable resin in which the spaces of the lattice are filled with the second material, thereby reinforcing the second material.

Still further practices include those in which the materials are waxes or waxen materials or wax-like materials.

DESCRIPTION OF DRAWINGS

These and other features of the invention will be apparent from the following detailed description and the accompanying figures, in which:

FIG. 10 shows a kernel that remains after the support material has been melted away;

FIG. 11 shows examples of support materials and build materials;

DETAILED DESCRIPTION

Figure 1:
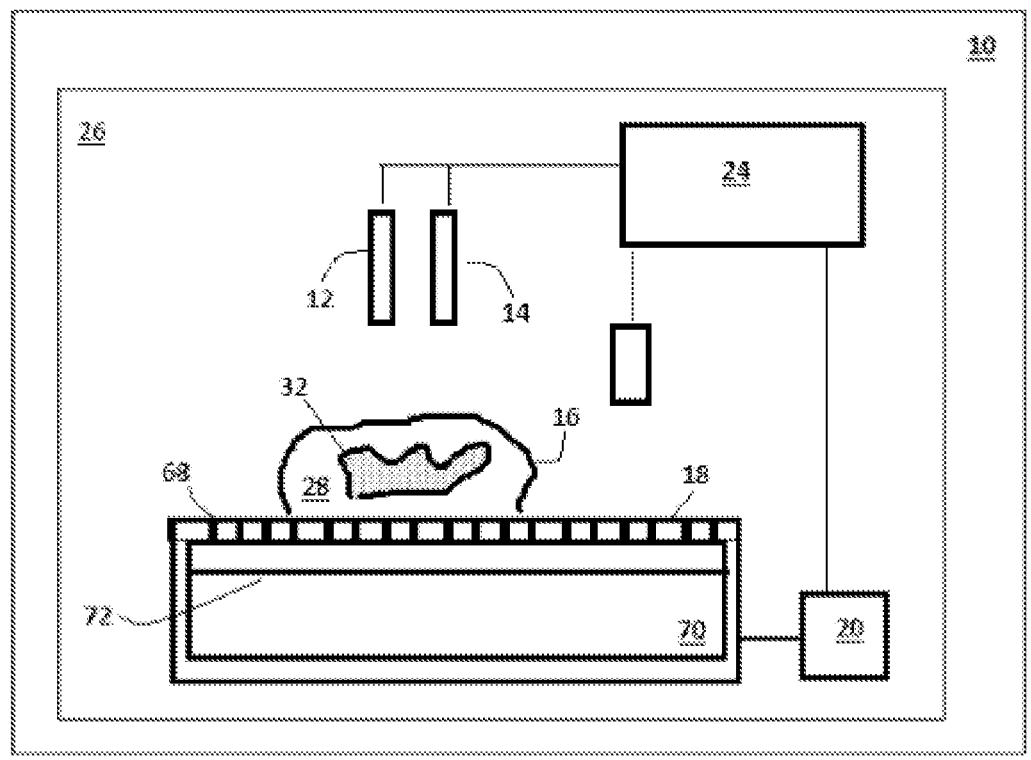
FIG. 1 shows an additive-manufacturing machine.

FIG. 1 shows an additive-manufacturing machine 10 that uses first and second jets 12, 14 to eject corresponding materials to form a composite object 16 on a platform 18. An actuator 20 causes relative motion between the platform 18 and the jets 12, 14. In the illustrated embodiment, the actuator 20 achieves such relative motion by moving platform 18. However, the actuator 20 could in principle move the jets 12, 14 or both the jets 12, 14 and the platform 18.

The additive-manufacturing machine 10 includes a profilometer 22 that provides a feedback signal to a controller 24 that controls deposition by the jets 12, 14. The additive-manufacturing machine 10 forms the composite object 16 on a layer-by-layer basis within a build chamber 26.

Figure 2:
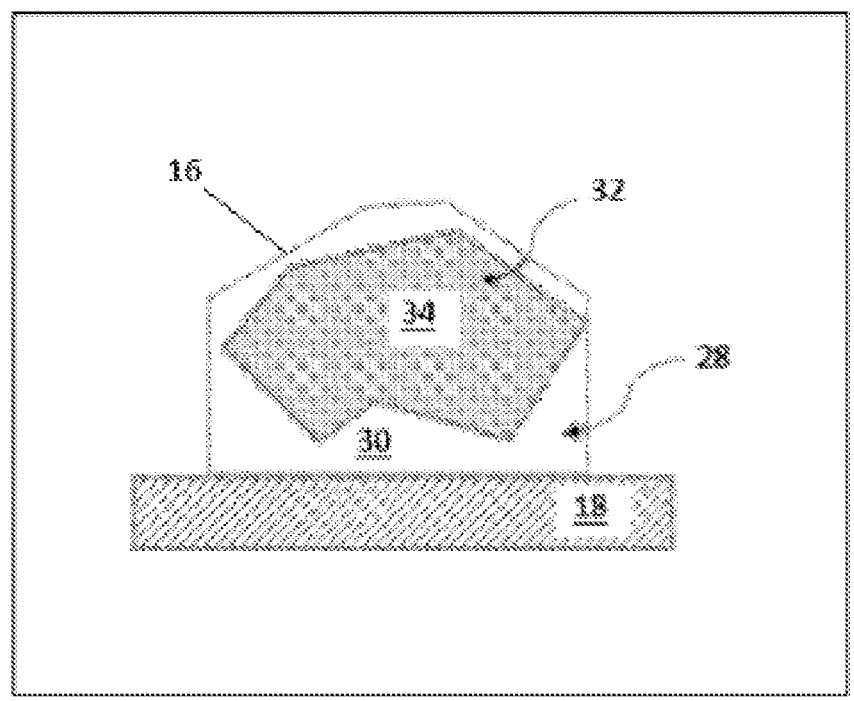
FIG. 2 shows a composite object built by the additive-manufacturing machine of FIG. 1.
Figure 3:
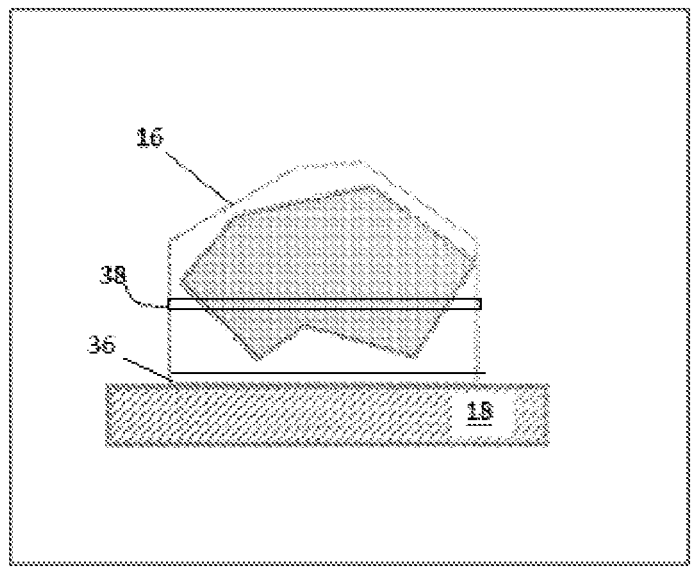
FIG. 3 shows the layers of the composite object of FIG. 3.

Referring now to FIG. 2, the composite object 16 has a first volume 28 that has been formed from a support material 30 and a second volume 32 that has been formed from a build material 34. To form such a composite object 16, the first jet 12 ejects the support material 30 and the second jet 14 ejects the build material 34. The controller 24 causes the first and second jets 12, 14 to lay down homogenous layers 36 and composite layers 38, as shown in FIG. 3.

To lay down a homogenous layer 36, the controller 24 activates only the first jet 12. As a result, a homogenous layer 36 consists of only the support material 30. To lay down a composite layer 38, the controller 24 activates only the first jet 12 at certain times and activates only the second jet 14 at other times. Plan views of exemplary composite layers 38 that result are shown in FIG. 4, FIG. 5, and FIG. 6.

Figure 4:
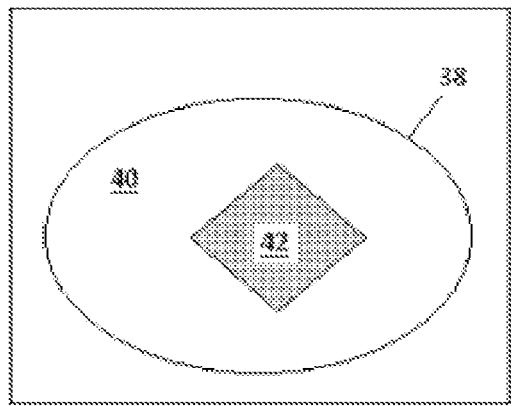
FIG. 4 shows a plan view of a composite layer from the composite object of FIG. 3.
Figure 9:
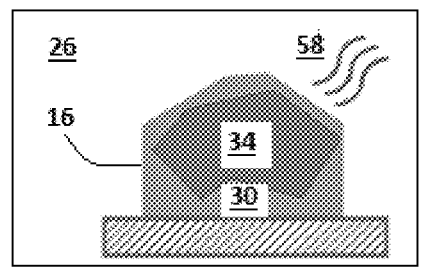
FIG. 9 shows a completed composite object in the process of having the support material melted away.

As shown in a plan view in FIG. 4, the composite layer 38 comprises a support region 40 and a build region 42. The support region 40 is formed from the support material 30 and the build region 42 is formed from the build material 34. In the embodiment of FIG. 4, the support region 40 is disposed adjacent to an outer boundary of the build region 42. In some embodiments, a finished composite object 16 appears as shown in FIG. 4, with the build region 42 being partially exposed on at least one face rather than completely encased as is shown in FIG. 9.

Figure 5:
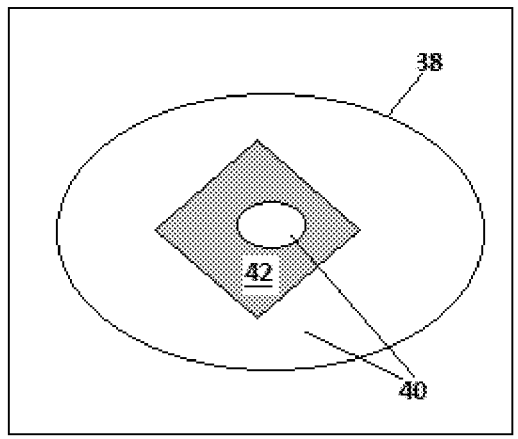
FIG. 5 shows an alternative composite layer in which the support region is adjacent to inner and outer boundaries of the build region.

FIG. 5 shows an alternative embodiment in which the support region 40 is disposed to be adjacent to both the outer boundary and an inner boundary of the build region 42. In the embodiment shown in FIG. 5, the support region 40 is a discontinuous region.

Figure 6:
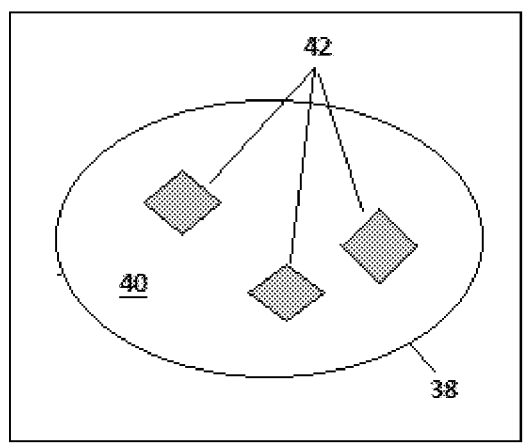
FIG. 6 shows an alternative composite layer in which the build region is discontinuous.

FIG. 6 shows yet another embodiment featuring an archipelagic build region 42 having both concave and convex islands of build material 34. In this embodiment, the build region 42 is thus discontinuous.

The ability to construct composite layers 38 with different distributions of build regions 42 and support regions 40 permits construction of a second volume 32 that would not otherwise be self-supporting if printed by itself. For example, if one were to attempt to build a second volume 32 having a cantilevered overhang by itself, the overhang would have a tendency to droop until the build material 34 had hardened sufficiently. The support material 30 in the first volume 28 provides the support needed to resist such deformation.

Figure 7:
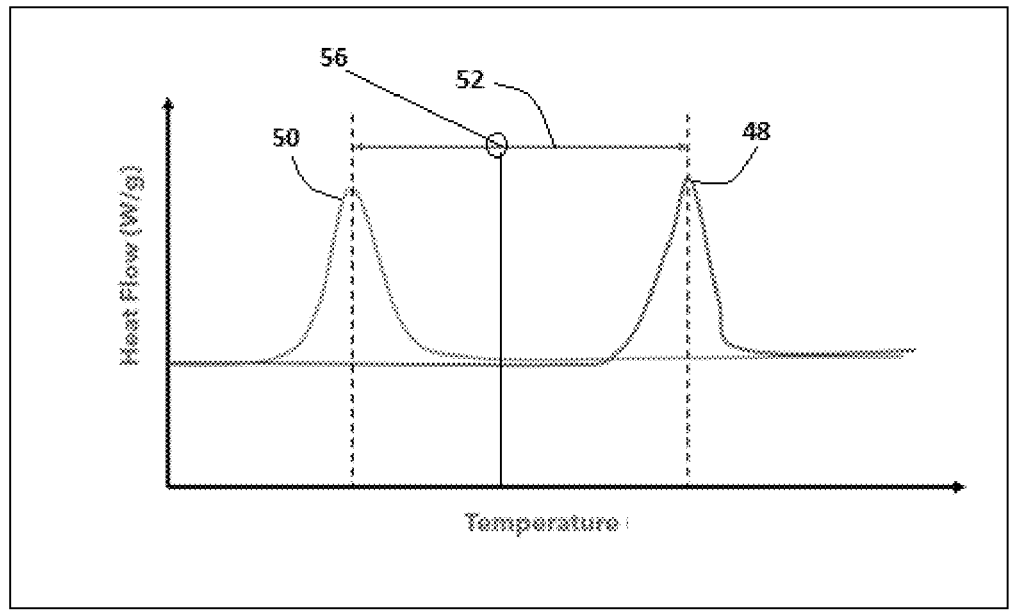
FIG. 7 shows heat flow into the build material and support material from which the composite object of FIG. 2 has been made.

FIG. 7 shows the heat that flows into the support material 30 and into the build material 34 as a function of temperature. The build material 34 has a build-material melting point 48 and the support material 30 has a support-material melting point 50. The support-material melting point 50 is lower than the build-material melting point 48. As is apparent, there exists a temperature gap 52 between build-material melting point 48 and the support-material melting point 50. It is preferable that this temperature gap 52 be wide enough to safely melt away the support material 30 without appreciably softening the build material 34.

Figure 8:
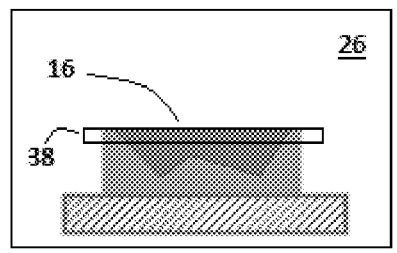
FIG. 8 shows a partially-built composite object.

FIG. 8 shows the composite object 16 at an intermediate stage of fabrication after some but not all layers have been deposited. The most recently deposited layer is a composite layer 38. Throughout the process of depositing layers, the temperature within the build chamber 26 is maintained below the support-material melting point 50.

FIG. 9 shows the completed composite object 16 being exposed to a bath temperature 56 that is within the temperature gap 52. A useful way to expose the composite object 16 to such the bath temperature 56 is to place the composite object 16 in a fluid bath 58 in which the temperature is maintained within the temperature gap 52. Examples of suitable fluids include gaseous fluids, such as air, and liquid fluids, such as water. As used herein, the word "bath" refers to exposure to any fluid (gas or liquid) whether still or moving. A useful device for use as a bath is a convection oven in which warm air is blown past the composite object 16.

In some practices, the energy used to melt the support material 30 arrives by radiation rather than convection. This can be achieved by placing the composite object 16 under a heat lamp to expose it to thermal radiation or by illuminating the composite object 16 with microwave radiation, for example by placement thereof in a microwave oven that has been set to deliver only enough energy to melt the support material 30 but not enough to melt the build material 34. In those cases, in which radiation is used, it is particularly useful to select the support material 30 to be one that is highly absorbent to the wavelength of radiation being used and to select the build material 34 to not be excessively absorbent of that wavelength, thereby avoiding inadvertently melting the build material 34.

Exposure to the bath temperature 56 causes the support material 30 to melt away while leaving behind a solid kernel 60 of build material 34, as shown in FIG. 10.

FIG. 11 shows examples of materials that are suitable for use as a support material 30 together with their respective support-material melting points 50. In addition, FIG. 11 shows examples of materials that are suitable for use as a build material 34 together with their respective build-material melting points 48. The build material 34 and the support material 30 are preferably waxen, or wax-like materials, including wax. It is particularly useful for the support material 30 and the build material 34 to be insoluble in each other. Such insolubility promotes a more distinct boundary between the build material 34 and the support material 30.

The kernel 60 is useful for a variety of purposes. In some embodiments, the kernel 60 is used as a mold. in others, the kernel 60 is used for investment casting.

In still other embodiments, the kernel 60 is used for thermoforming or stamping. In such a process, a material to be formed is placed over the kernel 60. Since this typically involves exertion of force against the kernel 60, it is useful for the kernel 60 to be reinforced to avoid damage resulting from this force. A suitable reinforcement can be achieved by mixing resin beads into the build material 34 or by using a wire that has been embedded into the build material 34.

In still other embodiments, the kernel 60 is used as a form for deposition of another material either by sputtering or by an electrolytic process.

Figure 12:
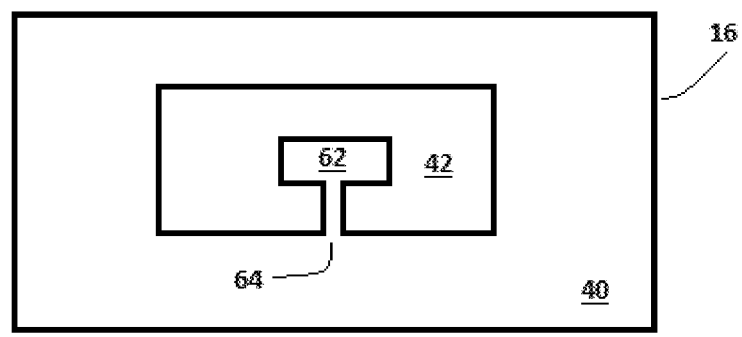
FIG. 12 shows a composite object having a composite layer as shown in FIG. 5.

The ability to deposit a composite layer 38 as shown in FIG. 5 makes it possible to construct a kernel 60 having an internal void 62, as shown in FIG. 12. Upon completion of the composite object 16, the void 62 would be filled with support material 30. Thus, such embodiments feature one or more drains 64 that allows the support material 30 to be drained way during exposure to the bath temperature 56. Such a drain 64 by having layers similar to that shown in FIG. 5 lying below the void 62.

Figure 13:
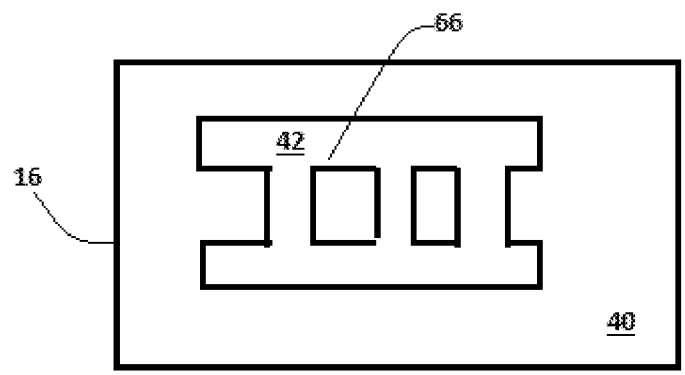
FIG. 13 shows a composite object having a composite layer as shown in FIG. 6.

The ability to deposit a composite layer 38 as shown in FIG. 6 makes it possible to construct a kernel 60 having an arch 66, as shown in FIG. 13. In such an embodiment, a drain 64 need not be supplied.

In some embodiments, the platform 18 includes perforations 68 over a tank 70. When the support material 30 melts, it flows through the perforations 68 and into the tank 70. This permits recovery of the support material 30 so that it can be used to form another composite object 16. A similar procedure permits recovery of the build material 34. For those embodiments in which the build material 34 includes reinforcement, a filter 72 between the perforations 68 and the tank 70 captures the reinforcing structures, thus purifying the build material 34.

A particularly useful feature is that the support material 30, once melted, is easily recoverable and can therefore be used again to make another composite object 16. In those cases, in which the kernel 60 is no longer needed, it is likewise possible to melt it down and recover the build material 34 so that it can be used again to make another composite object 16. In those cases, in which the build material 34 has been reinforced, it is possible to filter out the reinforcing structure from the melted building material 34 so that a purer building material 34 can be recovered.

Figure 14:
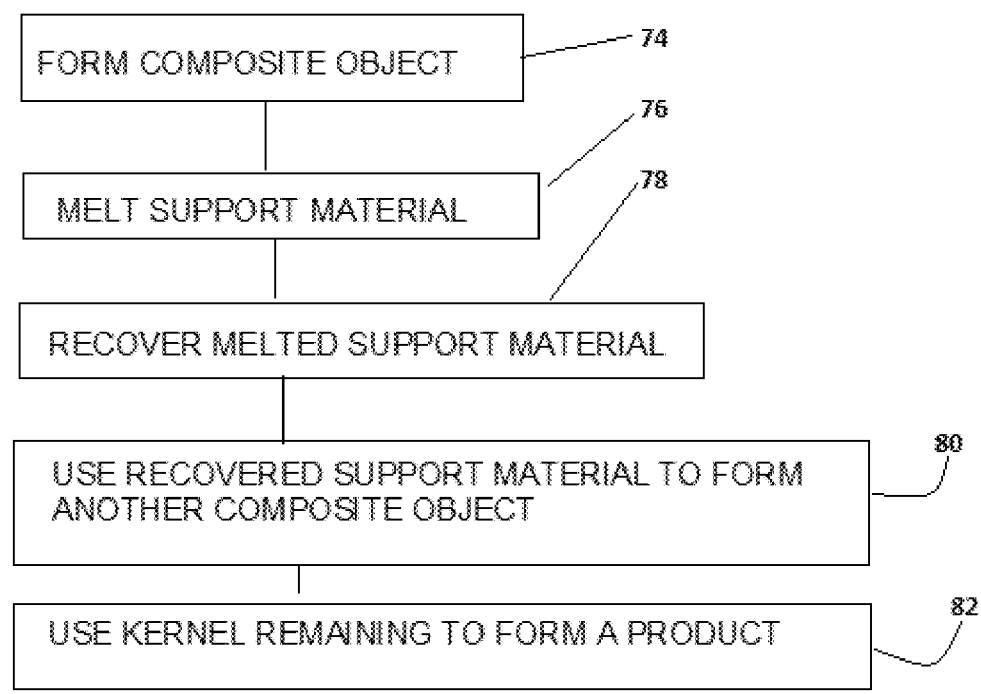
FIG. 14 is a flow chart of a method that includes melting the support material from the composite object to leave behind the kernel of FIG. 10.

FIG. 14 shows a flow chart of a method that includes forming a composite object 16 from support material and building material (step 74), melting the support material, thereby leaving a kernel made of the building material (step 76), recovering the melted support material (step 78) and using it to form another composite object (step 80) and using the kernel to form a product (step 82), for example by molding, casting, deposition, or sputtering of another material.

It is to be understood that the foregoing description is intended to illustrate and not to limit the scope of the invention, which is defined by the scope of the appended claims. Other embodiments are within the scope of the following claims.

What is claimed is:

1. A method comprising:
    using an additive manufacturing process to form a first composite object comprising a first wax and a second wax, the first wax being adjacent to the second wax,
    wherein the first and second waxes are solids have corresponding first and second melting temperatures, respectively, the first melting temperature being lower than the second melting temperature,
    after having formed the first composite object, exposing the first composite object to a temperature that is between the first melting temperature and the second melting temperature such that the first wax melts, thereby leaving behind a second object comprising the second wax, which was used to form the first composite object,
    forming a product from a third material, wherein forming the product comprises using the second object to make an impression on the third material and separating the third material from the second object,
    after having formed the product, recovering the second wax, which was used to form the second object, by melting the second wax, and
    using the additive manufacturing process to form a further composite object, the further composite object comprising the second wax, which was used to form the first composite object, and which was subsequently recovered from the second object as a result of having melted the second object.

2. The method of claim 1,
    wherein the third material has melting point higher than that of the second wax and
    wherein separating the third material from the second object comprises exposing the second wax and the third material to a temperature higher than the second melting temperature and lower than the melting point of the third material.

3. The method of claim 1, wherein the third material has a melting point lower than that of the second wax, and wherein forming the product comprises depositing the third material onto the second object and mechanically separating the third material from the second object.

4. The method of claim 1, further comprising depositing a conductor onto the second object, applying a voltage to the conductor while the second object is immersed in a solution, and causing solute from the solution to precipitate onto the conductor.

5. The method of claim 1, further comprising recovering at least some of the first wax.

6. The method of claim 1, further comprising recovering at least some of the first wax and using the recovered first wax to make another first composite object.

7. The method of claim 1, wherein the second object comprises reinforcements in the second wax.

8. The method of claim 1, further comprising embedding a wire in the second wax.

9. The method of claim 1, further comprising forming a lattice within the second wax, said lattice being formed from an ultraviolet-curable resin.

10. The method of claim 1, wherein said first and second waxes are insoluble in each other.

11. The method of claim 1, wherein said first composite object comprises a composite layer and said method comprises forming said composite layer by depositing said first wax, depositing said second wax, and depositing more of said first wax after having deposited said second wax.

12. The method of claim 1, further comprising reinforcing the second object.

13. The method of claim 12, wherein reinforcing the second object comprises mixing resin beads into the second wax.

* * * * *